(12) United States Patent
Syed et al.

(10) Patent No.: US 11,143,298 B2
(45) Date of Patent: Oct. 12, 2021

(54) METHOD FOR OPERATING A VEHICLE HAVING A TORQUE CONVERTER

(71) Applicant: Ford Global Technologies, LLC, Dearborn, MI (US)

(72) Inventors: Fazal Urrahman Syed, Canton, MI (US); William David Treharne, Ypsilanti, MI (US); Patrick Soderborg, Dexter, MI (US); Sassan Farahmand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 16/707,131

(22) Filed: Dec. 9, 2019

(65) Prior Publication Data
US 2021/0171006 A1    Jun. 10, 2021

(51) Int. Cl.
*F16H 61/50* (2006.01)
*B60W 10/02* (2006.01)
*F16D 39/00* (2006.01)
*F16D 33/18* (2006.01)
*B60W 20/13* (2016.01)

(52) U.S. Cl.
CPC .......... *F16H 61/50* (2013.01); *B60W 10/026* (2013.01); *B60W 20/13* (2016.01); *F16D 33/18* (2013.01); *F16D 39/00* (2013.01); *B60W 2510/0233* (2013.01); *B60W 2540/10* (2013.01); *B60W 2710/0666* (2013.01); *B60W 2710/083* (2013.01)

(58) Field of Classification Search
None
See application file for complete search history.

(56) References Cited

U.S. PATENT DOCUMENTS 9,809,212 B2    11/2017 Zhang et al.
2014/0162838 A1    6/2014 Doering et al.
2018/0281778 A1    10/2018 Zhang et al.

*Primary Examiner* — Timothy Hannon
(74) *Attorney, Agent, or Firm* — David Kelley; McCoy Russell LLP

(57) ABSTRACT

A method for operating a vehicle that includes a torque converter is described. In one example, the method adjusts torque of an electric machine in response to a requested torque converter speed. The requested torque converter speed linearizes torque output of a torque converter so that vehicle wheel torque control may be improved.

20 Claims, 6 Drawing Sheets

METHOD FOR OPERATING A VEHICLE HAVING A TORQUE CONVERTER

FIELD

The present description relates to methods and a system for operating a vehicle that includes a torque converter. The methods and systems may reduce a non-linear axle torque response to an accelerator input.

BACKGROUND AND SUMMARY

A vehicle may include a torque converter to smooth torque that is delivered from an engine to an automatic transmission. The torque converter also allows the engine to rotate at idle speed without the vehicle having to move. Torque that is input to the torque converter's impeller may be multiplied when the torque converter's clutch is open and when torque converter impeller speed is different than torque converter impeller speed. However, the torque converter's torque multiplication is non-linear such that a change in accelerator pedal position may not always result in a same proportional change in axle torque. For example, a torque that is input to a torque converter impeller may result in a first torque converter turbine torque when torque converter impeller speed is a first speed. The same torque that is input to the torque converter impeller may result in a second torque converter turbine torque when torque converter impeller speed is a second speed. Consequently, it may be difficult for a human driver to regulate axle torque during low vehicle speed conditions. Difficulty in regulating axle torque may be particularly noticeable while operating a vehicle off-road where driving surfaces may change significantly in a short distance of travel. Therefore, it may be desirable to provide a way of compensating for the torque converter's non-linear response so that human drivers may find vehicle wheel torque regulation easier at low vehicle speeds.

The inventors herein have recognized the above-mentioned issues and have developed a vehicle operating method, comprising: generating a torque converter speed ratio in response to a torque converter turbine torque request, an transmission fluid temperature, and a measured torque converter turbine speed; and adjusting a torque of an electric machine via a controller in response to a requested torque converter impeller speed that is based on the torque converter speed ratio.

By generating a torque converter speed ratio in response to a torque converter turbine torque request, a transmission fluid temperature, and a measured or estimated torque converter turbine speed, it may be possible to provide the technical result of linearizing torque output of a driveline via adjusting a torque of an electric machine in response to a requested torque converter impeller speed that is based on the torque converter speed ratio. In particular, the difference between a requested torque converter impeller speed and an actual torque converter impeller speed may be reduced so that an accelerator pedal position generates a unique and repeatable torque converter turbine torque that may be delivered to vehicle wheels even during conditions of varying transmission fluid temperature and actual turbine speed. This contrasts with an accelerator pedal position that is used to generate a propulsion source torque that may be modified in many different ways via the torque converter to generate different torque converter turbine torques, which may result in different wheel torques.

The present description may provide several advantages. Specifically, the approach may improve low speed vehicle launches. The approach may also simplify vehicle control for human drivers. In addition, the approach may reduce driveline torque disturbances, thereby improving vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
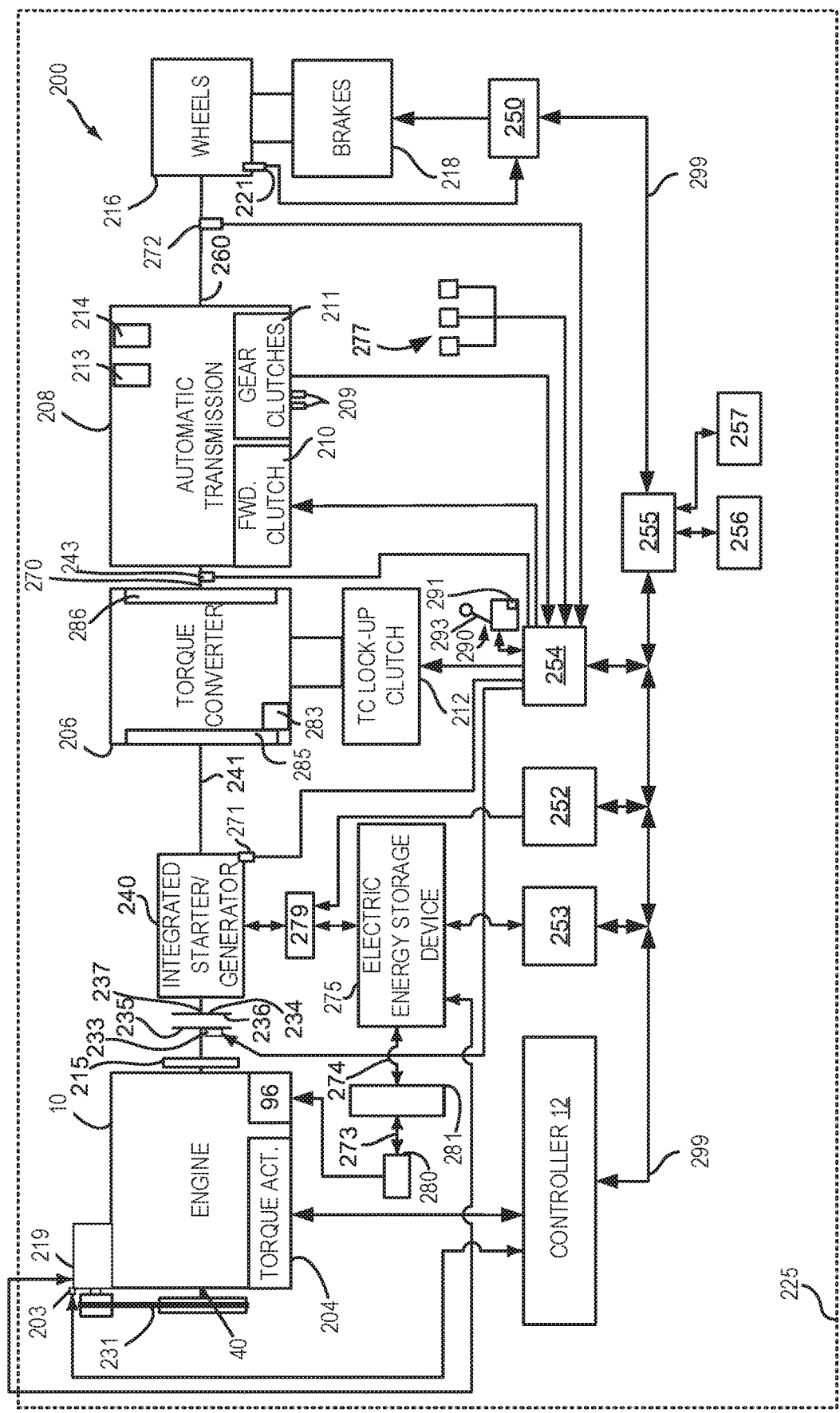
FIG. 2 shows a schematic diagram of an example vehicle driveline or powertrain including the internal combustion engine shown in FIG. 1.
Figure 3:
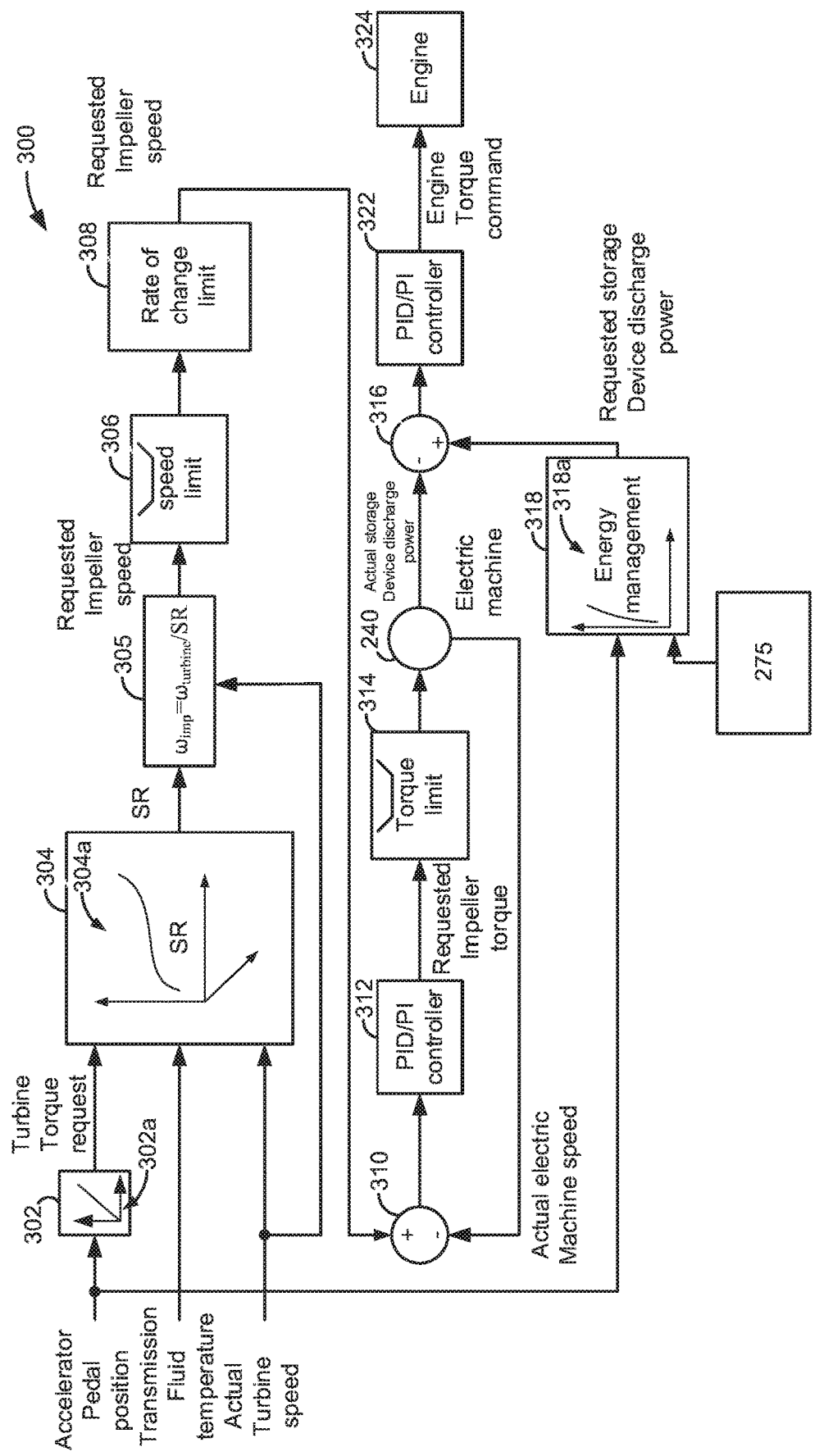
FIG. 3 shows a block diagram of a method for controlling driveline torque.
Figure 4:
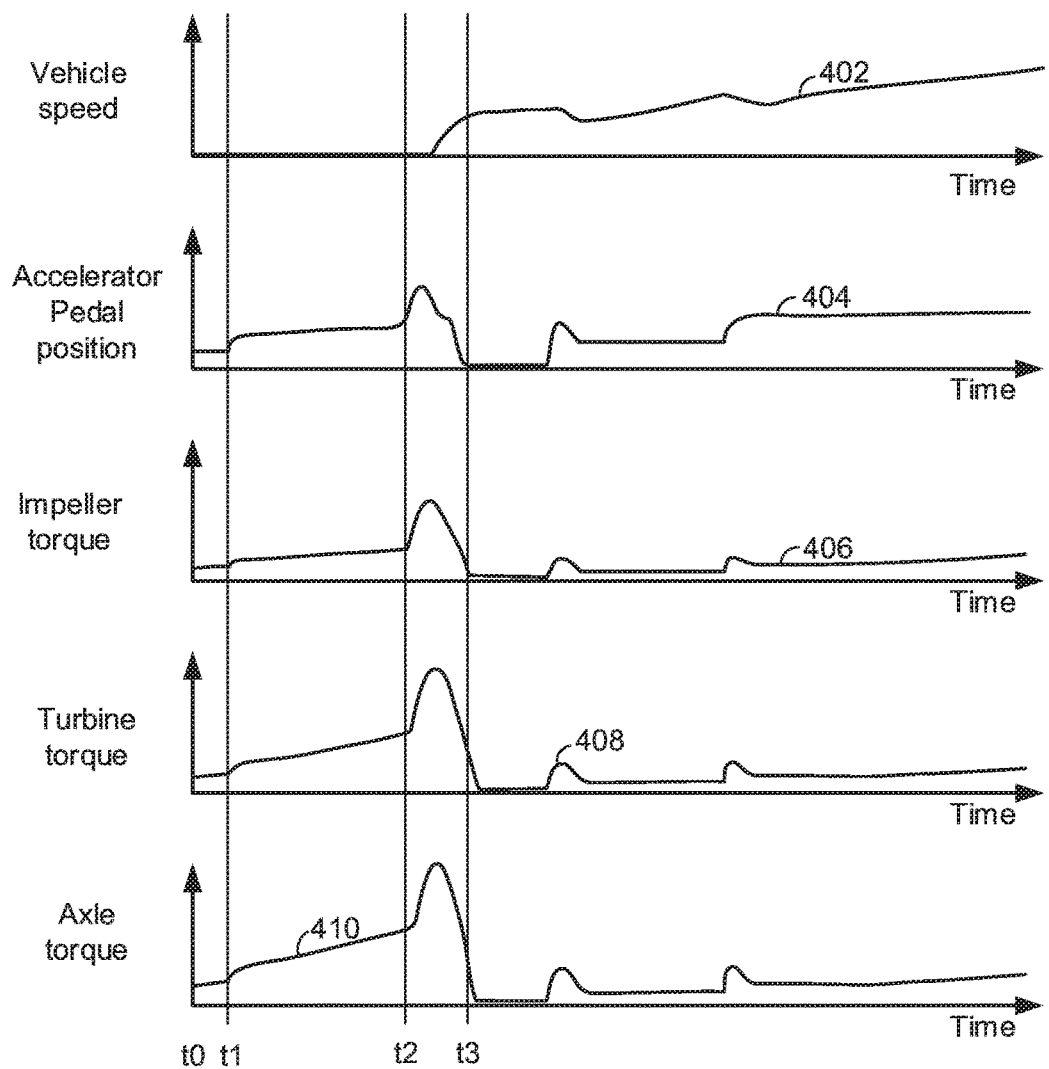
FIG. 4 shows a prior art example sequence of driveline torque control.
Figure 5:
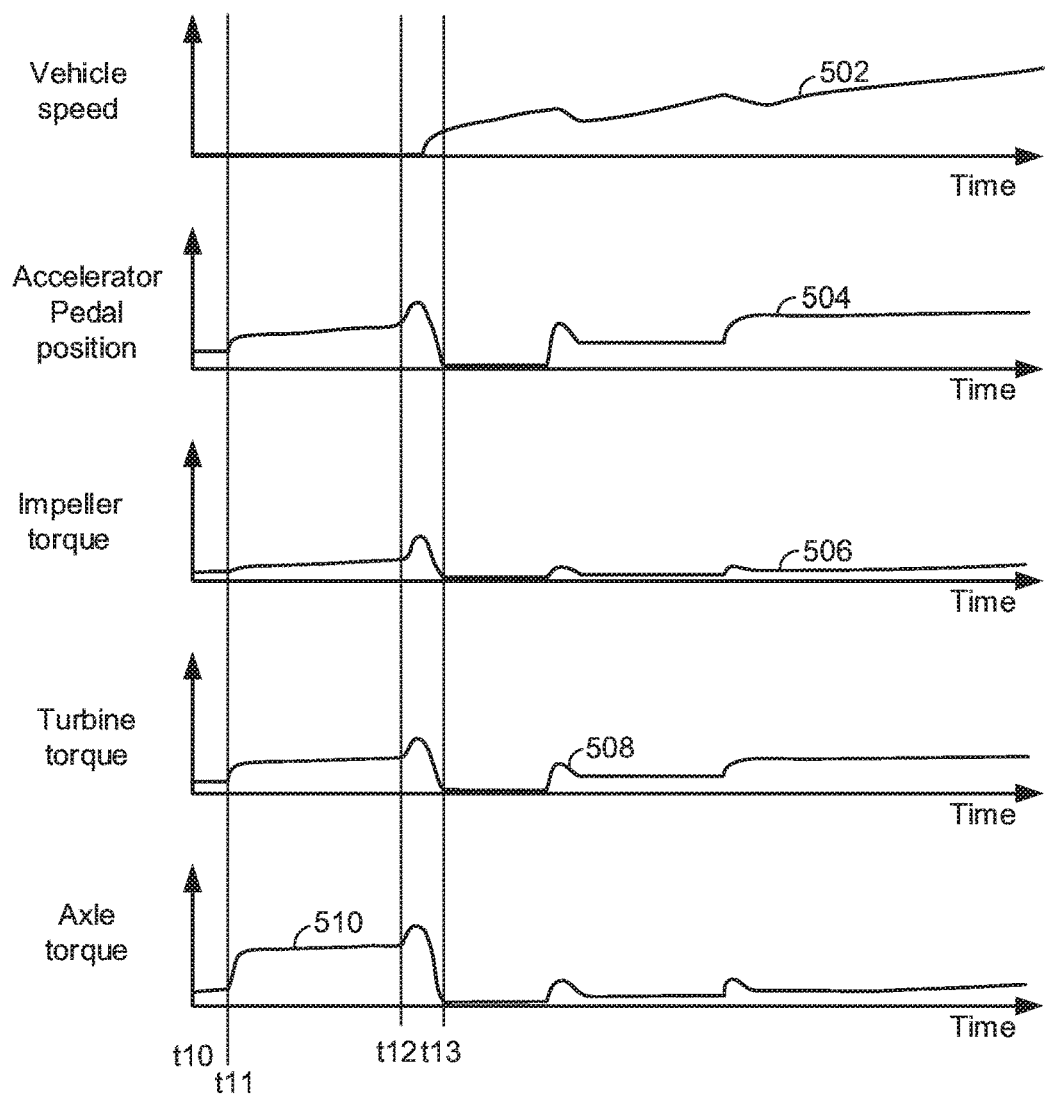
FIG. 5 shows a driveline torque control sequence according to the method of FIG. 3.
Figure 6:
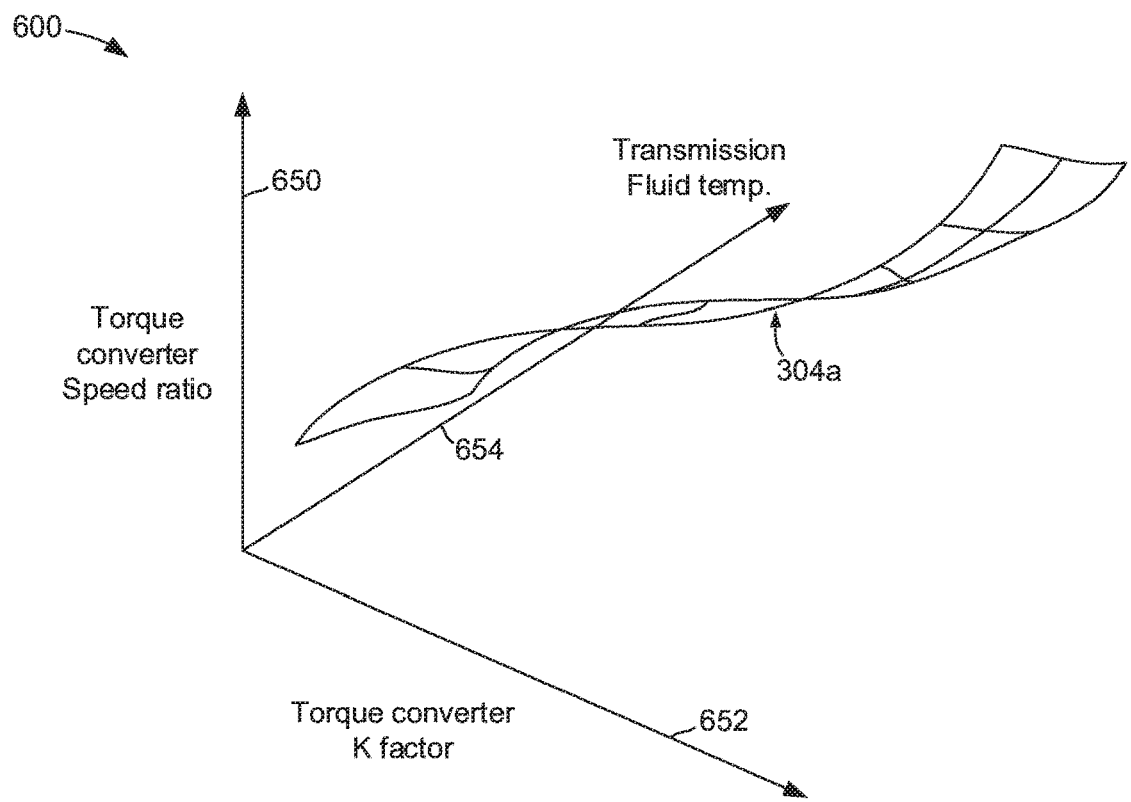
FIG. 6 shows an example function for determining a torque converter speed ratio from a turbine torque request that is generated via an accelerator pedal.

The present description is related to operating a driveline that has a torque converter. The torque converter may be positioned in the driveline downstream of an engine and downstream of an electric machine. The electric machine may provide torque to the driveline when driver demand torque is low or when it may be desirable to boost engine power. The driveline may include an internal combustion engine of the type shown in FIG. 1. The engine may be included in a driveline or powertrain as shown in FIG. 2. The driveline may be operated according to the method shown in FIG. 3 to linearize a relationship between accelerator pedal position and wheel torque that is delivered via a torque converter. A driveline operating sequence according to the prior art is shown in FIG. 4. A driveline operating sequence according to the method of FIG. 3 is shown in FIG. 5 and an example function for determining a requested or desired torque converter speed ratio is shown in FIG. 6. The desired torque converter speed ratio is used to determine a desired torque converter impeller speed that generates a requested torque converter impeller torque that is linear with accelerator pedal position.

Figure 1:
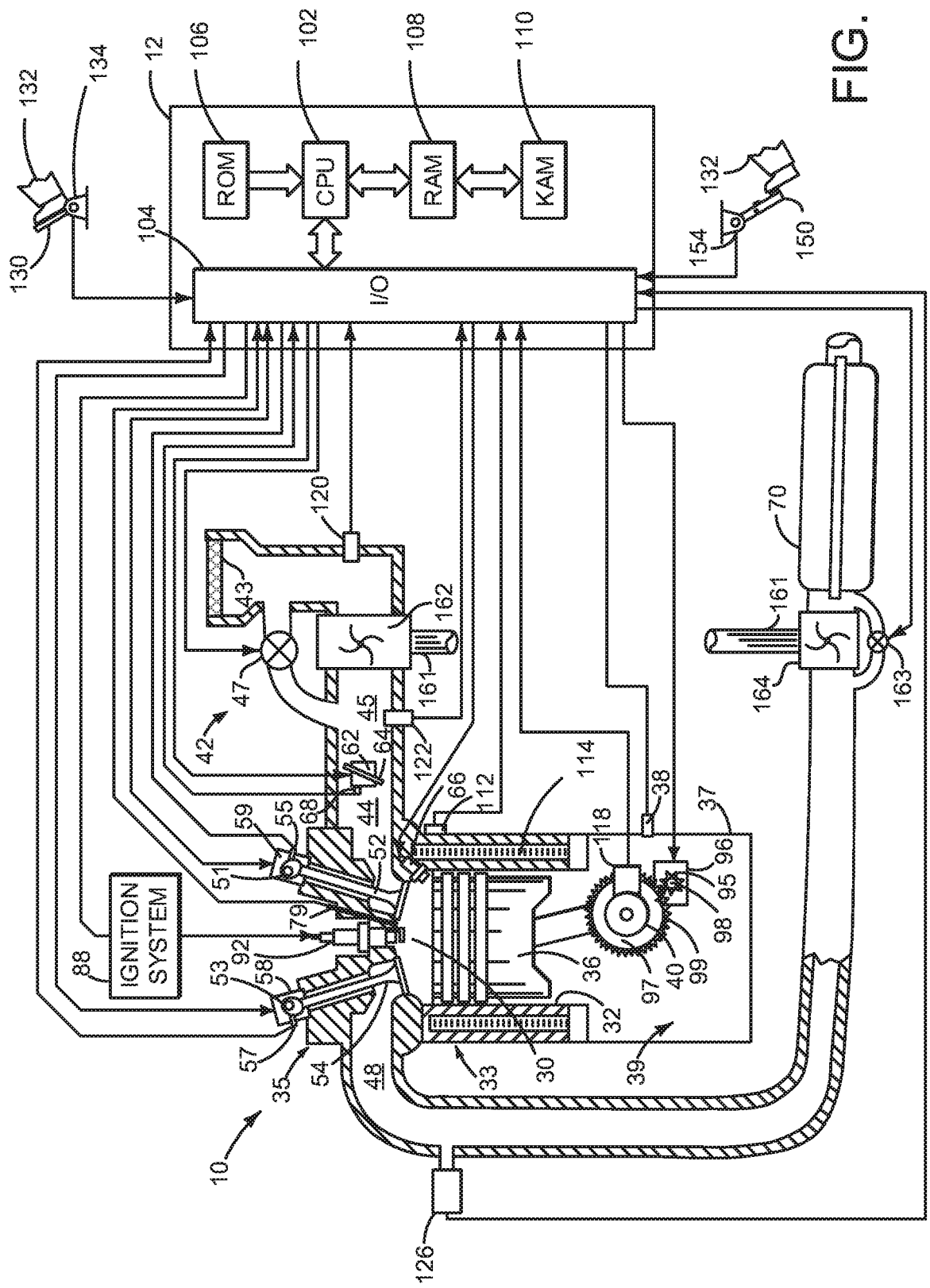
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. Pressure in crankcase 39 may be sensed via pressure sensor 38. Alternatively, pressure in crankcase 39 may be estimated.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via Belt-Driven Integrated Starter-Generator (BISG) 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG 219 may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. Torque converter turbine speed may be estimated or measured via optional turbine position sensor 243, or alternatively, via position sensor 272 and the presently engaged transmission gear ratio. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or torque request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG power from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine torque to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. Engine braking torque or negative engine torque may be provided by rotating the engine with the engine generating power that is insufficient to rotate the engine. Thus, the engine may generate a braking torque via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives torque converter impeller position via position sensor 271. Transmission controller 254 may convert torque converter impeller position into torque converter impeller speed via counting a number of known angular distance pulses over a predetermined time interval. Controller 254 may count shaft position pulses via position sensor 272 over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission fluid temperature sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a vehicle system, comprising: an electric machine; a torque converter coupled to the electric machine and a step ratio transmission; a controller including executable instructions stored in non-transitory memory to cause the controller to generate a torque converter speed ratio from a torque converter map that is referenced via a torque converter turbine torque request, transmission fluid temperature, and an estimated torque converter turbine speed, and additional instructions to adjust a speed of the electric machine according to the torque converter speed ratio. The vehicle system further comprises additional instructions to generate a torque converter impeller speed request via dividing the estimated torque converter turbine speed by the torque converter speed ratio. The vehicle system further comprises additional instructions to generate the torque converter turbine torque request from an accelerator pedal position. The vehicle system includes where the torque converter turbine torque request is generated via a torque converter turbine torque map. The vehicle system further comprises additional instructions to limit a rate of change of the torque converter impeller speed request. The vehicle system further comprises additional instructions to generate a torque converter impeller speed request error via subtracting an actual speed of the electric machine from the torque converter impeller speed request. The vehicle system further comprises additional instructions to apply a proportional/integral controller to the torque converter impeller speed request error.

Referring now to FIG. 3, a block diagram 300 of a method for operating a vehicle is shown. At least portions of method 300 may be implemented as executable controller instructions stored in non-transitory memory. Method 300 may operate in cooperation with the system of FIGS. 1 and 2. Additionally, portions of method 300 may be actions taken in the physical world to transform an operating state of an actuator or device. The method of FIG. 3 may be incorporated into the system of FIGS. 1 and 2 as executable instructions stored in non-transitory memory.

At block 302, accelerator pedal position references a torque converter turbine torque map 302a to determine a requested torque converter turbine torque. Block 302 outputs a torque converter turbine torque request or an amount of torque that is requested at the torque converter turbine to block 304. Thus, the output of block 302 is a torque converter turbine that is directly linked to accelerator pedal position. The accelerator pedal position references a table or function (e.g., a map) 302a. Table or function 302a contains and outputs empirically determined values of torque converter turbine torque. In one example, requested torque converter turbine torque increases linearly in a 1:1 ratio with accelerator pedal position so that a 10% deflection in accelerator pedal position corresponds to 10% of a maximum torque converter turbine torque. Thus, there may be a linear relationship between accelerator pedal position and requested torque converter turbine torque. This relationship may exist whether or not the transmission is engaged in a gear or in neutral.

The torque converter turbine torque request, transmission fluid temperature, and the measured or estimated torque converter turbine speed are input to block 304 and block 304 outputs a requested torque converter speed ratio (SR). The actual torque converter turbine speed, requested torque converter turbine torque, and transmission fluid temperature reference a table or function (e.g., a map) 304a (e.g., a torque converter map). The table or function outputs a requested torque converter speed ratio. The map or function 304a is an empirical model of a torque converter. Values in the table or function may be determined via installing the torque converter in a test stand and monitoring torque converter speed ratio, torque converter turbine torque, torque converter turbine speed, and torque converter fluid temperature (e.g., also referred to as transmission fluid temperature). The requested torque converter speed ratio is input to block 305.

At block 305, a requested torque converter impeller speed ($\omega_{imp}$) is determined. The requested torque converter impeller speed is determined via dividing the requested torque converter turbine torque $\omega_{turbine}$ by the torque converter speed ratio (SR). Block 305 outputs the requested torque converter impeller speed to block 306.

At block 306, the torque converter turbine speed is limited to a speed that is greater than or equal to an engine idle speed. The torque converter turbine speed is limited to a speed that is greater than or equal to the engine idle speed so that the engine may not stall. Block 306 outputs the limited requested torque converter impeller speed to block 308.

Block 306 limits a rate of change of the torque converter impeller speed request. For example, block 306 may prevent the torque converter impeller speed request from increasing by a rate that is greater than a predetermined amount (e.g., 200 RPM/second) so that torque modulation may provide a smooth driveline torque progression. Block 306 outputs the rate limited torque converter impeller speed request to summing junction 310.

At summing junction 310, the actual torque converter impeller speed is subtracted from the requested torque converter impeller speed. The result is input to block 312. The result as a torque converter impeller speed error.

Block 312 represents a proportional/integral (PI) controller. Alternatively, block 312 may be a proportional/integral/derivative (PID) controller. In one example, the PI controller may be expressed as: $CO = K_p \cdot e(t) + K_i \cdot \int e(t)dt$, where CO is the controller output, $K_p$ is the proportional gain (e.g., a scalar real number), e(t) is the torque converter impeller speed error with respect to time (t), and $K_i$ is the integral gain (e.g., scalar real number). The PI or PID controller operates on the error value and the output of the PI or PID controller is a requested torque converter impeller torque. The requested torque converter impeller torque is input to block 314.

At block 314, the requested torque converter impeller torque is limited such that electric machine torque request are limited to less than a first torque (e.g., 200 Newton-meters) and to greater than a second torque (e.g., −200 Newton-meters). In other words, electric machine torque is prevented from exceeding the first torque and prevented from being less than the second torque. Torque of electric machine 240, or alternatively the engine 10, is adjusted such that the electric machine or engine rotates the impeller speed at a speed that generates the requested torque converter impeller torque. Torque of the electric machine is adjusted via adjusting voltage and/or current that is applied to the electric machine. Torque of the engine is adjusted via adjusting throttle position and fuel injection timing.

In this way, speed of an electric machine may be adjusted via adjusting torque of the electric machine so that the electric machine rotates a torque converter impeller at a speed that generates a torque converter turbine torque that is proportionate and linear with respect to accelerator pedal position. Further, there is a unique torque converter turbine torque for a given accelerator pedal position and the relationship between accelerator pedal position and torque converter turbine torque is linear. Nevertheless, operating the electric machine in this way may impact electric energy storage device state of charge. Therefore, method 300 includes a way to balance electric energy storage device state of charge.

The actual amount of electric energy storage device discharge power or the actual amount of discharge power is determined via monitoring voltage and current that is supplied to electric machine 240 via electric energy storage device 275. The actual amount of electric energy storage device discharge power is input to summing junction 316.

Accelerator pedal position and state of charge (SOC) of electric energy storage device 275 are input to block 318. Block 318 includes a table or function (e.g., map) 318a that outputs a requested electric energy storage device discharge power. The actual electric energy storage device discharge power amount is subtracted from the requested electric energy storage device discharge power amount to generate an electric energy storage device discharge error. The electric energy storage device discharge error is output from summing junction 316 to block 322.

Block 322 represents a proportional/integral (PI) controller. Alternatively, block 322 may be a proportional/integral/derivative (PID) controller. In one example, the PI controller may be expressed as: $CO=K_p \cdot e(t)+K_i \cdot \int e(t)dt$, where CO is the controller output, $K_p$ is the proportional gain (e.g., a scalar real number), e(t) is the torque converter impeller speed error with respect to time (t), and $K_i$ is the integral gain (e.g., scalar real number). The PI or PID controller operates on the electric energy storage device discharge error and the PI or PID controller outputs a requested engine torque. The requested engine torque is delivered to the engine and the engine delivers the requested engine torque. The requested engine torque may be delivered via adjusting engine throttle position, fuel injection, and spark timing.

In this way, engine torque may be adjusted so that if energy storage device SOC is low, additional engine torque is requested so that the electric machine 240 may convert the engine torque into electric energy that may then be stored in the electric energy storage device. If energy storage device SOC is high, no engine torque may be requested and driveline torque may be provided solely via the electric machine 240.

Thus, method 300 provides for vehicle operating method, comprising: generating a torque converter speed ratio in response to a torque converter turbine torque request, an transmission fluid temperature, and a measured torque converter turbine speed; and adjusting a torque of an electric machine via a controller in response to a requested torque converter impeller speed that is based on the torque converter speed ratio. The method includes where the torque of the electric machine is adjusted via a proportional/integral controller. The method further comprises determining the requested torque converter impeller speed via dividing the measured torque converter turbine speed by the torque converter speed ratio. The method further comprises referencing the torque converter map via the torque converter turbine torque request, the transmission fluid temperature, and an actual torque converter turbine speed to generate the torque converter speed ratio. The method further comprises generating the torque converter turbine torque request via a torque converter turbine torque map. The method further comprises referencing the torque converter turbine torque map via accelerator pedal position. The method further comprises limiting a rate of change of the requested torque converter impeller speed.

The method of FIG. 2 also provides for a vehicle operating method, comprising: generating a torque converter speed ratio in response to a torque converter turbine torque request, an transmission fluid temperature, and a measured torque converter turbine speed; adjusting a torque of an electric machine via a controller in response to a requested torque converter impeller speed that is based on the torque converter speed ratio; and adjusting an engine torque in response to an error between a requested electric energy storage device discharge power and an actual electric energy storage discharge power. The method includes where the requested electric energy storage device discharge power is a function of accelerator pedal position and state of charge of an electric energy storage device. The method further comprises applying a proportional/integral controller to the error between the requested electric energy storage device discharge power and the actual electric energy storage discharge power. The method includes where the actual electric energy storage discharge power is based on adjusting the torque of the electric machine. The method further comprises adjusting the torque of the electric machine in response to accelerator pedal position. The method further comprises adjusting the torque of the electric machine in response to transmission fluid temperature.

In another representation, the method of FIG. 3 provides for a vehicle operating method, comprising: adjusting a speed of an electric machine via a controller to generate a torque converter impeller torque that is proportionate to an accelerator pedal position. The method further comprises determining a torque converter impeller speed based on accelerator pedal position, transmission fluid temperature, and actual torque converter turbine speed. The method further comprises adjusting an engine torque responsive to an amount of electric power discharged from an electric energy storage device to the electric machine.

Referring now to FIG. 4, a prior art vehicle operating sequence is shown. The plots shown in FIG. 4 are time aligned and occur at the same time. The vertical lines represent times of interest during the sequence.

The first plot from the top of FIG. 4 is a plot of vehicle speed versus time. The vertical axis represents the vehicle speed and the vehicle speed increases in the direction of the vertical axis arrow. The horizontal axis represents time and time increases from the left side of the figure to the right side of the figure. Trace 402 represents the vehicle speed.

The second plot from the top of FIG. 4 is a plot of accelerator pedal position versus time. The vertical axis represents the accelerator pedal position and the accelerator pedal position increases (e.g., is applied further) in the direction of the vertical axis arrow. The horizontal axis represents time and time increases from the left side of the figure to the right side of the figure. Trace 404 represents the accelerator pedal position.

The third plot from the top of FIG. 4 is a plot of torque converter impeller torque versus time. The vertical axis represents the torque converter impeller torque and torque converter impeller torque increases in the direction of the vertical axis arrow. The horizontal axis represents time and time increases from the left side of the figure to the right side of the figure. Trace 406 represents the torque converter impeller torque.

The fourth plot from the top of FIG. 4 is a plot of torque converter turbine torque versus time. The vertical axis represents the torque converter turbine torque and the torque converter turbine torque increases in the direction of the vertical axis arrow. The horizontal axis represents time and time increases from the left side of the figure to the right side of the figure. Trace 408 represents the torque converter turbine torque.

The fifth plot from the top of FIG. 4 is a plot of vehicle axle torque versus time. The vertical axis represents the vehicle axle torque and the vehicle axle torque increases in the direction of the vertical axis arrow. Trace 410 represents the vehicle axle torque. The horizontal axis represents time and time increases from the left side of the figure to the right side of the figure.

At time t0, the accelerator pedal is applied a small amount and vehicle speed is zero. The torque converter impeller torque is at a lower level and the torque converter turbine torque is at a lower level. The axle torque is at a lower level.

At time t1, the human driver applies the accelerator pedal while the vehicle speed remains zero. The torque converter impeller torque begins to increase as the accelerator pedal is applied. The torque converter impeller torque may increase due to an increase in engine torque or an increase in electric machine torque. The torque converter turbine torque also begins to increase in response to the increase in the increase in accelerator pedal position. The axle torque begins to increase as the torque converter turbine torque begins to increase.

Between time t1 and time t2, the vehicle speed remains zero and the accelerator pedal position is gradually increased via the driver. The torque converter impeller torque increases gradually with the increase in accelerator pedal position. Additionally, the torque converter turbine torque increases at a rate that is greater than the rate of torque increase of the torque converter impeller torque due to torque multiplication within the torque converter. The higher rate of increase in torque converter turbine torque may make it more difficult for the vehicle's human driver to control wheel torque. The axle torque increases at a rate that is similar to the rate of torque converter turbine torque increase.

At time t2, the driver applies the accelerator pedal a larger amount to initiate acceleration of the vehicle and the vehicle begins to accelerate between time t2 and time t3. The torque converter impeller torque increases as accelerator pedal position increases. The torque converter turbine torque increases at an even higher rate, thereby increasing the axle torque more significantly with smaller increases in accelerator pedal position. The larger rate of increase in torque converter turbine torque may help to cause the vehicle's driver to apply the accelerator farther than may be desired to provide a desired amount of axle torque. The torque converter output may be non-linear with respect to accelerator pedal position and engine and/or electric machine torque. In this example, the driver also releases the accelerator pedal to slow the vehicle acceleration rate between time t2 and time t3.

At time t3, the accelerator pedal position reaches zero (e.g., fully released) and the torque converter turbine torque is reduced to a lower value shortly thereafter. The torque converter impeller torque is also reduced to a lower value and the axle torque is reduced to a lower value. This behavior may be attributed to torque converter torque multiplication that is from driveline inertia and a desire to prevent engine stalling when the accelerator pedal is fully released. Thus, the torque converter turbine torque and axle torque may not accurately follow torque that is requested via the accelerator pedal position. Further, there is not a consistent torque relationship between accelerator pedal position and torque converter turbine torque.

Referring now to FIG. 5, a prophetic vehicle operating sequence according to the method of FIG. 3 is shown. The vehicle operating sequence of FIG. 5 may be provided via the system of FIGS. 1 and 2 in cooperation with the method of FIG. 3. The plots shown in FIG. 5 are time aligned and occur at the same time. The vertical lines represent times of interest during the sequence.

The first plot from the top of FIG. 5 is a plot of vehicle speed versus time. The vertical axis represents the vehicle speed and the vehicle speed increases in the direction of the vertical axis arrow. The horizontal axis represents time and time increases from the left side of the figure to the right side of the figure. Trace 502 represents the vehicle speed.

The second plot from the top of FIG. 5 is a plot of accelerator pedal position versus time. The vertical axis represents the accelerator pedal position and the accelerator pedal position increases (e.g., is applied further) in the direction of the vertical axis arrow. The horizontal axis represents time and time increases from the left side of the figure to the right side of the figure. Trace 504 represents the accelerator pedal position.

The third plot from the top of FIG. 5 is a plot of torque converter impeller torque versus time. The vertical axis represents the torque converter impeller torque and torque converter impeller torque increases in the direction of the vertical axis arrow. The horizontal axis represents time and time increases from the left side of the figure to the right side of the figure. Trace 506 represents the torque converter impeller torque.

The fourth plot from the top of FIG. 5 is a plot of torque converter turbine torque versus time. The vertical axis represents the torque converter turbine torque and the torque converter turbine torque increases in the direction of the vertical axis arrow. The horizontal axis represents time and time increases from the left side of the figure to the right side of the figure. Trace 408 represents the torque converter turbine torque.

The fifth plot from the top of FIG. 5 is a plot of vehicle axle torque versus time. The vertical axis represents the vehicle axle torque and the vehicle axle torque increases in the direction of the vertical axis arrow. Trace 510 represents the vehicle axle torque. The horizontal axis represents time and time increases from the left side of the figure to the right side of the figure.

At time t10, the accelerator pedal is applied a small amount and vehicle speed is zero. The torque converter impeller torque is at a lower level and the torque converter turbine torque is at a lower level. The axle torque is at a lower level.

At time t11, the human driver applies the accelerator pedal while the vehicle speed remains zero. The torque converter impeller torque begins to increase as the accelerator pedal is applied. The torque converter impeller torque may increase due to an increase in engine torque or an increase in electric machine torque. The torque converter turbine torque also begins to increase in response to the increase in the increase in accelerator pedal position. The axle torque begins to increase as the torque converter turbine torque begins to increase.

Between time t11 and time t12, the vehicle speed remains zero and the accelerator pedal position is gradually increased via the driver (not shown). The torque converter impeller torque increases gradually with the increase in accelerator pedal position. Additionally, the torque converter turbine torque increases with accelerator pedal position. In particular, there is torque multiplication between the torque converter impeller torque and the torque converter turbine torque, but torque converter turbine torque increases consistently with the increase in accelerator pedal position. This may allow a vehicle's driver to operate the vehicle with greater ease. There is a uniform rate of change in torque converter impeller torque and torque converter turbine torque. The axle torque increases at a rate that is similar to the rate of torque converter turbine torque increase since it is a multiplication of turbine torque by the gear ratio.

At time t12, the driver applies the accelerator pedal a larger amount to initiate acceleration of the vehicle and the vehicle begins to accelerate between time t12 and time t13. The torque converter impeller torque increases as accelerator pedal position increases. The torque converter turbine torque increases similarly with the rate of change in accelerator pedal position. In this example, the driver releases the accelerator pedal to slow the vehicle acceleration rate between time t12 and time t13.

At time t3, the accelerator pedal position reaches zero (e.g., fully released) and the torque converter turbine torque is reduced to a lower value shortly thereafter. The torque converter impeller torque is also reduced to a lower value and the axle torque is reduced to a lower value. Thus, the torque converter turbine torque and axle torque may accurately follow torque that is requested via the accelerator pedal position. Further, there is a consistent torque relationship between accelerator pedal position and torque converter turbine torque.

Referring now to FIG. 6, an example torque converter map is shown in plot 600. Plot 600 includes a function 304a, which is shown as a mesh, representing the output of plot 600. Plot 600 is referenced or indexed via a torque converter speed ratio (e.g., SR=torque converter impeller speed/torque converter turbine speed), torque converter K factor, and transmission fluid temperature. The vertical axis 650 represents the torque converter speed ratio SR. Axis 652 represents torque converter K factor, which may be determined via operation the torque converter in a dynamometer and monitoring torque converter speeds and torques. Axis 654 represents transmission fluid temperature and transmission fluid temperature increases from the origin of plot 600 in the direction of the arrow of axis 654.

Mesh 304a shows that the torque converter speed ratio decreases with increasing transmission fluid temperature. Mesh 304a also shows that the torque converter speed ratio increases with decreasing torque converter K factor. The torque converter K factor represents the torque converter's capacity to transfer torque across the torque converter. The torque capacity of the torque converter is lower for lower K factor values.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
generating a torque converter speed ratio in response to a torque converter turbine torque request and a measured torque converter turbine speed; and
adjusting a torque of an electric machine via a controller in response to a requested torque converter impeller speed that is based on the torque converter speed ratio.

2. The method of claim 1, where the torque of the electric machine is adjusted via a proportional/integral controller, and where the torque converter speed ratio is generated in further response to a transmission fluid temperature.

3. The method of claim 1, further comprising determining the requested torque converter impeller speed via dividing the measured torque converter turbine speed by the torque converter speed ratio.

4. The method of claim 3, further comprising referencing a torque converter map via the torque converter turbine torque request, a transmission fluid temperature, and an actual torque converter turbine speed to generate the torque converter speed ratio.

5. The method as claimed in claim 4, further comprising generating the torque converter turbine torque request via a torque converter turbine torque map.

6. The method of claim 5, further comprising referencing the torque converter turbine torque map via accelerator pedal position.

7. The method of claim 1, further comprising limiting a rate of change of the requested torque converter impeller speed.

8. A vehicle system, comprising:
an electric machine;

a torque converter coupled to the electric machine and a step ratio transmission;

a controller including executable instructions stored in non-transitory memory to cause the controller to generate a torque converter speed ratio from a torque converter map that is referenced via a torque converter turbine torque request and an estimated torque converter turbine speed, and additional instructions to adjust a speed of the electric machine according to the torque converter speed ratio.

9. The vehicle system of claim 8, further comprising additional instructions to generate a torque converter impeller speed request via dividing the estimated torque converter turbine speed by the torque converter speed ratio.

10. The vehicle system of claim 9, further comprising additional instructions to generate the torque converter turbine torque request from an accelerator pedal position.

11. The vehicle system of claim 10, where the torque converter turbine torque request is generated via a torque converter turbine torque map, and where the torque converter map is also referenced via a transmission fluid temperature.

12. The vehicle system of claim 11, further comprising additional instructions to limit a rate of change of the torque converter impeller speed request.

13. The vehicle system of claim 11, further comprising additional instructions to generate a torque converter impeller speed request error via subtracting an actual speed of the electric machine from the torque converter impeller speed request.

14. The vehicle system of claim 11, further comprising additional instructions to apply a proportional/integral controller to the torque converter impeller speed request error.

15. A vehicle operating method, comprising:

generating a torque converter speed ratio in response to a torque converter turbine torque request and a measured torque converter turbine speed;

adjusting a torque of an electric machine via a controller in response to a requested torque converter impeller speed that is based on the torque converter speed ratio; and adjusting an engine torque in response to an error between a requested electric energy storage device discharge power and an actual electric energy storage discharge power.

16. The method of claim 15, where the requested electric energy storage device discharge power is a function of accelerator pedal position and state of charge of an electric energy storage device, and where the torque converter speed ratio is generated in further response to a transmission fluid temperature.

17. The method of claim 15, further comprising applying a proportional/integral controller to the error between the requested electric energy storage device discharge power and the actual electric energy storage discharge power.

18. The method of claim 15, where the actual electric energy storage discharge power is based on adjusting the torque of the electric machine.

19. The method of claim 15, further comprising adjusting the torque of the electric machine in response to accelerator pedal position.

20. The method of claim 15, further comprising adjusting the torque of the electric machine in response to transmission fluid temperature.

* * * * *